United States Patent [19]

Volkonsky

[11] Patent Number: 5,996,056

[45] Date of Patent: *Nov. 30, 1999

[54] APPARATUS FOR REDUCING A COMPUTATIONAL RESULT TO THE RANGE BOUNDARIES OF A SIGNED 8-BIT INTEGER IN CASE OF OVERFLOW

[75] Inventor: Vladimir Y. Volkonsky, Moscow, Russian Federation

[73] Assignee: Sun Microsystems, Inc., Palo Alto, Calif.

[*] Notice: This patent is subject to a terminal disclaimer.

[21] Appl. No.: 08/881,511

[22] Filed: Jun. 24, 1997

Related U.S. Application Data

[62] Division of application No. 08/880,335, Jun. 23, 1997, Pat. No. 5,887,181.

[51] Int. Cl.[6] .................................................. G06F 15/16
[52] U.S. Cl. ................................. 712/1; 712/23; 712/32; 712/221; 708/490; 708/495; 708/498; 708/519; 710/104; 710/107; 710/126; 710/128; 710/129; 710/130
[58] Field of Search .................................... 712/1, 23, 42, 712/32, 221; 364/736, 737, 745, 745.03, 757; 708/490, 495, 498, 519; 710/104, 107, 126, 128, 129, 130

[56] References Cited

U.S. PATENT DOCUMENTS

| | | | |
|---|---|---|---|
| 4,675,725 | 6/1987 | Parkyn | 358/22 |
| 4,945,507 | 7/1990 | Ishida et al. | 364/737 |
| 5,222,159 | 6/1993 | Kawamura et al. | 382/48 |
| 5,402,368 | 3/1995 | Yamada et al. | 364/736 |
| 5,402,506 | 3/1995 | Schafer | 382/50 |
| 5,408,670 | 4/1995 | Davies | 395/800 |
| 5,508,951 | 4/1996 | Ishikawa | 364/745 |
| 5,539,685 | 7/1996 | Otaguro | 364/757 |
| 5,734,744 | 3/1998 | Wittenstein et al. | 382/166 |
| 5,887,181 | 3/1999 | Volkonsky | 395/800.01 |
| 5,896,396 | 4/1999 | Sanghani et al. | 371/21.1 |

OTHER PUBLICATIONS

"The UltraSPARC Processor—Technology White Paper; The UltraSPARC Architecture," pp. 1–10, Copyright 1994–1997 Sun Microsystems, Inc., Palo Alto, CA.

*Primary Examiner*—Meng-Ai T. An
*Assistant Examiner*—Dzung Nguyen
*Attorney, Agent, or Firm*—D'Alessandro & Ritchie

[57] ABSTRACT

An intermediate result signal arising from a manipulation of data signals is checked and reduced without using conditional branches, thereby improving instruction processing. Data signals are represented as signed 8-bit binary values in a two's compliment format. This requires that the intermediate result signal be stored in a register that is greater than 8-bits wide to allow for the proper checking of an overflow condition. A processor operating under program control with the program has the following operations. The program determines whether the intermediate result signal is in a positive overflow state or a negative overflow state. A first mask signal is set to have 8 lower bits in an OFF position when the intermediate result signal is inside the range of a signed 8 bit integer. Otherwise, the first mask signal is set to have 8 lower bits in an ON position. Also, a second mask signal is set to have 8 lower bits in the OFF position when the intermediate result signal is not in the positive or negative overflow state. Otherwise, the second mask signal is set to an upper threshold signal when the data signal is in an overflow state or setting the second mask signal to a lower threshold signal when the data signal is in a negative overflow state. The intermediate result is bitwise ANDed with the first mask signal to obtain a translated data signal, and the translated data signal is bitwise ORed with the second mask signal.

8 Claims, 3 Drawing Sheets

APPARATUS FOR REDUCING A COMPUTATIONAL RESULT TO THE RANGE BOUNDARIES OF A SIGNED 8-BIT INTEGER IN CASE OF OVERFLOW

CROSS-REFERENCE TO RELATED APPLICATION

This application is a division of patent application Ser. No. 08/880,335 filed Jun. 23, 1997, U.S. Pat. No. 5,887,181 and entitled, "METHOD AND APPARATUS FOR REDUCING A COMPUTATIONAL RESULT TO THE RANGE BOUNDARIES OF A SIGNED 8-BIT INTEGER IN CASE OF OVERFLOW", by inventor Vladimir Yu. Volkonsky, assignor to Sun Microsystems, Inc., a Delaware corporation.

BACKGROUND OF THE INVENTION

1. Field of the Invention

This invention relates to an apparatus for optimizing overflow checking and reduction of data signals represented as signed 8-bit integers.

2. Description of Related Art

The explosion of graphics, audio, and video ("multimedia") related applications in computer systems has fueled efforts in improving processor efficiency with regard to processing multimedia signals. Multimedia signals include audio and pixel ("picture elements") signals, among other things, and which may be sufficiently represented using binary data of no more than eight bits of resolution. Binary data having greater widths may also be used but are often limited to intermediate results for advanced data manipulation since such data formats lead to an increase load on instruction execution, resulting in slower rates of data manipulation by a processor.

A computer system running a video application may represent color pixels through four signed 8-bit signals, with each signed 8-bit signal representing the three primary color values of red, green, and blue and an intensity value. This translates to a large amount of data signals required to represent an image for display on a computer screen even when restricting pixel data widths to eight bits. For example, to display a digital NTSC video signal in real-time on a computer monitor requires a pixel rate of 10.4 million pixels per second. With three data signals to manipulate per pixel, this translates to about 30 million pieces of data to manipulate per second. A processor clock rate of 200 million MHz would only have 20 clock cycles available for processing each pixel which is less than seven clock cycles for each primary color value.

Manipulating pixel data that are represented using signed 8-bit integers usually requires that the resulting pixel data remain within the maximum negative and positive boundaries of a signed 8-bit integer. A signed 8-bit integer in two's compliment format has a maximum range boundary of 127 and a minimum range boundary of −128. For example, when scaling or rotating images, it is necessary to combine the incoming signal being processed with other internally generated signal data in order to obtain the resulting pixel data. This ensures that if an overflow state does occur, the resulting pixel data is reduced to a value supported by the data format in which the pixel is represented. If either of the range boundaries is exceeded by the resulting pixel data, the resulting pixel data is reduced to within the maximum or minimum range boundaries of 127 and −128, respectively.

In the past, checking resulting pixel data for an overflow condition included using conditional branches. For example, in one such method branch operations in the programming language "C" are used in the following manner.

int dst;

if (dst > 127) dst = 127;

if (dst < −128) dst = −128;

The resulting pixel data, which is represented as the variable "dst," is compared with the upper range boundary of 127. If the resulting pixel data exceeds the upper range boundary, then the upper range boundary value is transferred into the resulting pixel data. Otherwise, a conditional branch occurs which bypasses the execution of the second operation. The third operation compares the resulting pixel data with the lower range boundary of −128. If the resulting pixel data exceeds the lower range boundary, then the lower range boundary value is transferred into the resulting pixel data. Otherwise, another conditional branch occurs which bypasses the execution of the third operation, i.e., the resulting pixel data falls within the range boundaries.

The use of conditional branches in a superscalar pipelined processor decreases processor execution throughput because the branches interrupt the pipeline processing of instructions. Also, conditional branches usually require processors to perform a memory fetch from intermediate or main memory in the event of a cache miss. Since intermediate or main memory is typically much slower than an instruction register which is used to process the instructions, the time to process the conditional branches takes much longer to complete than instructions that do not require fetches from intermediate or main memory. Thus, not only does the processor incur an increase in fetch latency but it also takes an efficiency hit due to the fact that the pipelining of instructions has been interrupted by the branches.

Accordingly, it would be desirable to provide an apparatus that ensures resulting pixel data or similar data using signed 8-bit integers remain within the range boundaries of a signed 8-bit integer without the use of conditional branches in an instruction. This advantage is achieved by performing three shift operations, two logic multiplications and one logic addition to obtain a result that is within the range boundaries of a signed 8-bit integer, improving the instruction throughput of a processor.

SUMMARY OF THE INVENTION

The present invention is directed to checking and reducing an intermediate result signal arising from a manipulation of data signals without using conditional branches, thereby improving instruction processing in a superscalar pipelined processor. In the preferred embodiment of the present invention, the data signals are represented as signed 8-bit binary values in a two's compliment format. This requires that the intermediate result signal be stored in a register that is greater than 8-bits wide to allow for the proper checking of an overflow condition.

It is presently contemplated that the present invention include using a processor operating under program control with the program having the following operations. The program determines whether the intermediate result signal is in a positive overflow state or a negative overflow state. The program sets a first mask signal to have 8 lower bits in an OFF position when the intermediate result signal is inside the range of a signed 8-bit integer. Otherwise, the program sets the first mask signal to have 8 lower bits in an ON position. Also, the program sets a second mask signal to have 8 lower bits in the OFF position when the intermediate result signal is not in the positive or negative overflow state. Otherwise, it sets the second mask signal equal to an upper threshold signal when the data signal is in an overflow state or setting the second mask signal to a lower threshold signal when the data signal is in a negative overflow state. Finally, the program bitwise ANDs the intermediate result with the first mask signal to obtain a translated data signal, and bitwise ORs the translated data signal with the second mask signal.

DESCRIPTION OF THE PREFERRED EMBODIMENTS

In the following description, a preferred embodiment of the invention is described with regard to preferred process steps and data structures. Those skilled in the art would recognize after perusal of this application that embodiments of the invention can be implemented using one or more general purpose processors operating under program control, or special purpose processors adapted to particular process steps and data structures, and that implementation of the process steps and data structures described herein would not require undue experimentation or further invention.

The present invention is directed to checking and if applicable, reducing an intermediate result signal arising from a manipulation of data signals without using conditional branches, thereby improving instruction processing in a superscalar pipelined processor.

The data signals are represented as 8-bit signed integers which requires the intermediate result signal to be stored in a register that is greater than 8-bits wide. This allows for the proper checking of an overflow condition. In the preferred embodiment, the focus of whether an overflow condition exists focuses on the state of the 8th and 9th bits of the intermediate result data. Consequently, intermediate registers need to have an 8th and 9th bit position but may be conventionally sized as 16 bit or 32 bit fixed-data values to fit within the processing scheme of a processor.

Data manipulations resulting in intermediate results that require checking for an overflow condition arises from many different types of signal processing applications. Images may be super-imposed, requiring pixel signals from the image sources to be processed so that when displayed, one image is semi-transparent over the other image. If the images are comprised of pixels represented as 8-bit signed integers, this results in combining pixels that occupy the same pixel space to a single intermediate result signal. To ensure that the intermediate result signal is within the 8-bit signed integer data scheme, its overflow condition must be checked. And if in the overflow condition, reduced to within the range boundaries of a signed 8-bit integer. The range boundaries of a signed 8-bit integer in a two's compliment format include a maximum positive range boundary of 127 and a maximum negative range boundary of −128.

Figure 1:
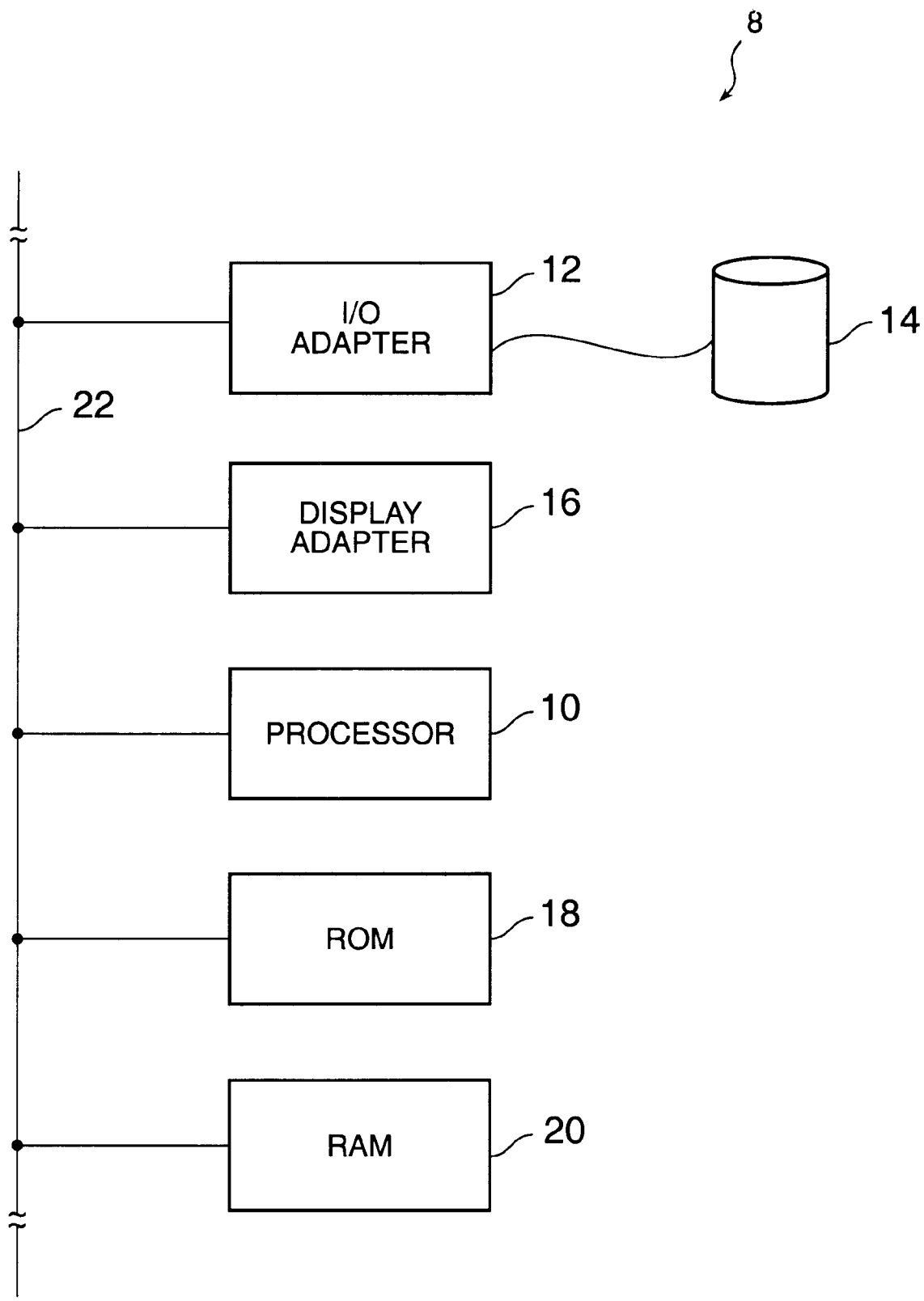
FIG. 1 is a schematic block diagram illustrating a computer system.

FIG. 1 is a schematic block diagram illustrating a computer system 8 in which the presently preferred invention would have application. Computer system includes a superscalar pipelined processor 10, an I/O adapter 12 coupled to a data store 14, a display adapter 16, a ROM 18, and RAM devices 20. A data and addressing bus 22 is also shown coupled to each of the items included with the computer system.

Figure 2:
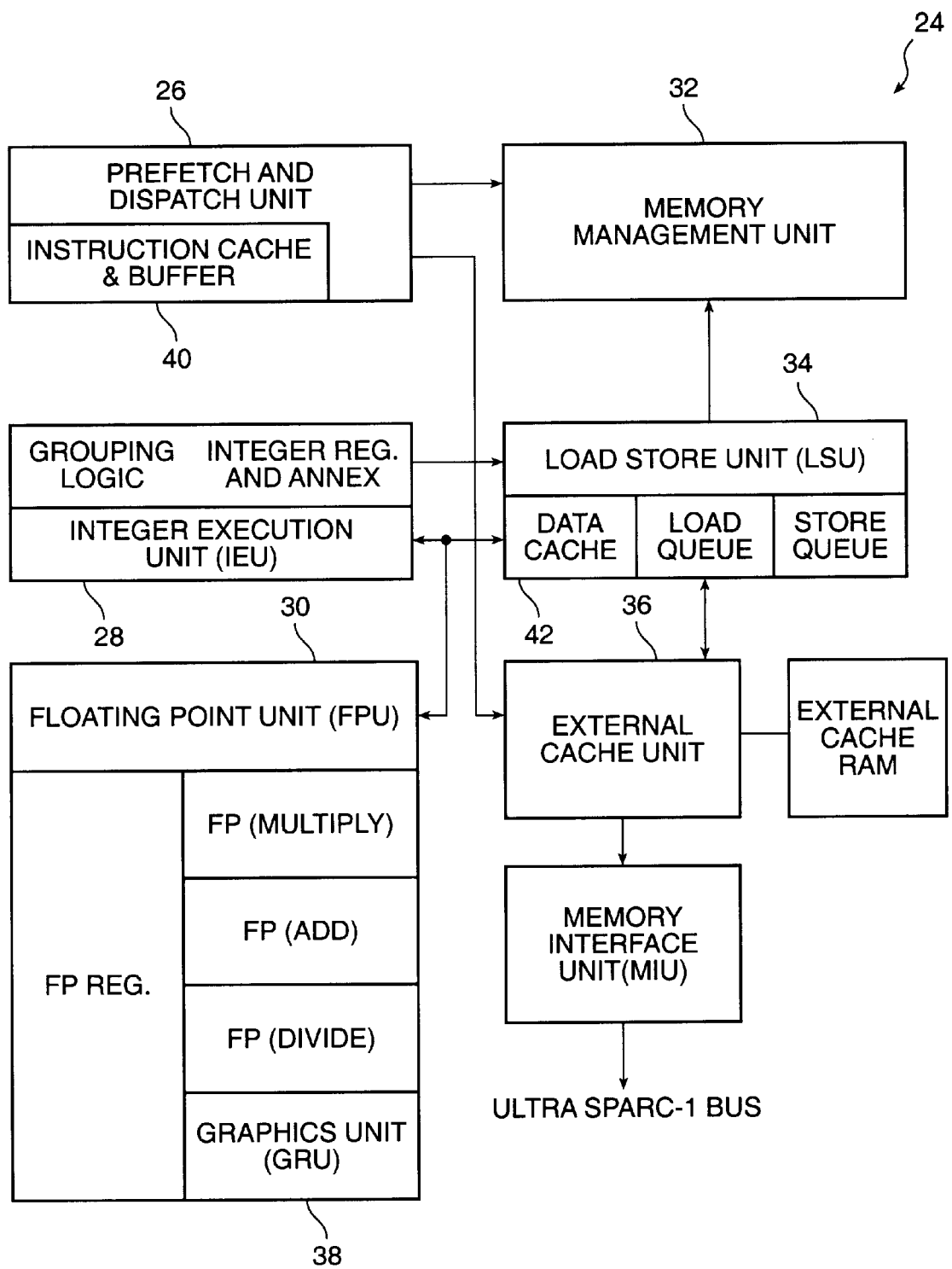
FIG. 2 is a schematic block diagram illustrating a processor used in accordance with a preferred embodiment of the present invention.

FIG. 2 is a schematic block diagram illustrating an example superscalar pipelined processor 24 used in accordance with a preferred embodiment of the present invention. A Prefetch and Dispatch Unit (PDU) 26, an Integer Execution Unit (IEU) 28, a Floating-Point Unit (FPU) 30, a Memory Management Unit (MMU) 32, a Load and Store Unit (LSU) 34, an External Cache Unit (ECU) 36, a Graphics Unit (GRU) 38, an Instruction Cache 40, and a Data Cache 42 are shown in FIG. 2. Superscalar pipelined processors are known in the art of computer architecture. Consequently, those of ordinary skill in the art will readily recognize that processor 24 is capable performing arithmetic and logical operations that include bitwise shifting, bitwise AND operations, bitwise OR operations, and addition operations when operating under program control.

The PDU 26 ensures that all execution units remain busy by fetching instructions before they are needed in the pipeline. Instructions can be prefetched from all levels of the memory hierarchy, including instruction cache 40, external cache 36, and main memory. The PDU 26 provides a 12-entry prefetch buffer which minimizes pipeline stalls. In addition, the PDU 26 has a 9-stage instruction pipeline to minimize latency and dynamic branch prediction to allow for greater prediction accuracy.

The pipeline is a double-instruction-issue pipeline with nine stages: fetch, decode, grouping, execution, cache access, load miss, integer pipe wait, trap resolution, and writeback. These stages imply that the latency (time from start to end of execution) of most instructions is nine clock cycles. However, at any given time, as many as nine instructions can execute simultaneously, producing an overall rate of execution of one clock per instruction in many cases. However, some instructions may require more than one cycle to execute due to the nature of the instruction such as a branch instruction or to a cache miss, or other resource contention.

The first stage of the pipeline is a fetch from instruction cache 40. In the second stage, instructions are decoded and placed in the instruction buffer. The third stage, grouping, groups and dispatches up to four instructions. Next, integer instructions are executed and virtual addresses calculated during the execution stage. In the fifth stage data cache 42 is accessed. Cache hits and misses are determined, and branches are resolved. If a cache miss was detected, the loaded miss enters the load buffer. At this point, the integer pipe waits for the floating-point/graphics pipe to fill and traps are resolved. In the final stage, writeback, all results are written to the register files and instructions are committed.

IEU 28 includes two ALU (arithmetic logical units) for arithmetic, logical, and shift operations, an eight window register file, result bypassing, and a Completion Unit which allows a nine-stage pipeline with minimal bypasses.

FPU 30 is a pipelined floating-point processor that consists of five separate functional units to support floating-point and multimedia operations. The separation of execution units allows the issuance and execution of two floating-point instructions per cycle. Source and data results are stored in a 32-entry register file in either 8, 16 or 32 bit lengths. Most floating-point instructions have a throughput of one cycle, a latency of three cycles, and are fully pipelined. The FPU is able to operate on both single precision (32-bit), and double-precision (64-bit) numbers, normalized or denormalized, in hardware, and quad-precision (128-bit) operands in software.

FPU 30 is tightly coupled to the integer pipeline and is capable of seamlessly executing a floating-point memory event and a floating-point operation. IEU 28 and FPU 30 have a dedicated control interface which includes the dispatch of operations fetched by the PDU 26 to the FPU 30. Once in the queue, the PDU 26 is responsible for distribution of instructions to the FPU 30. IEU 28 controls the data cache portion of the operation, while the FPU 30 decides how to manipulate the data. The IEU 28 and FPU 30 cooperatively detect floating-point data dependencies. The interface also includes IEU 28 and FPU 30 handshaking for floating-point exceptions. The FPU 30 performs all floating-point operations and implements a 3-entry floating-point instruction queue to reduce the impact of bottlenecks at the IEU 28 and improve overall performance.

MMU 32 handles all memory operations as well as arbitration between data stores and memory.

GRU 38 relies on integer registers of varying bit lengths for addressing image data, and floating point registers for manipulating that data. This division of labor enables processor to make full use of all available internal registers so as to maximize graphical throughput.

Method of Operation

Figure 3:
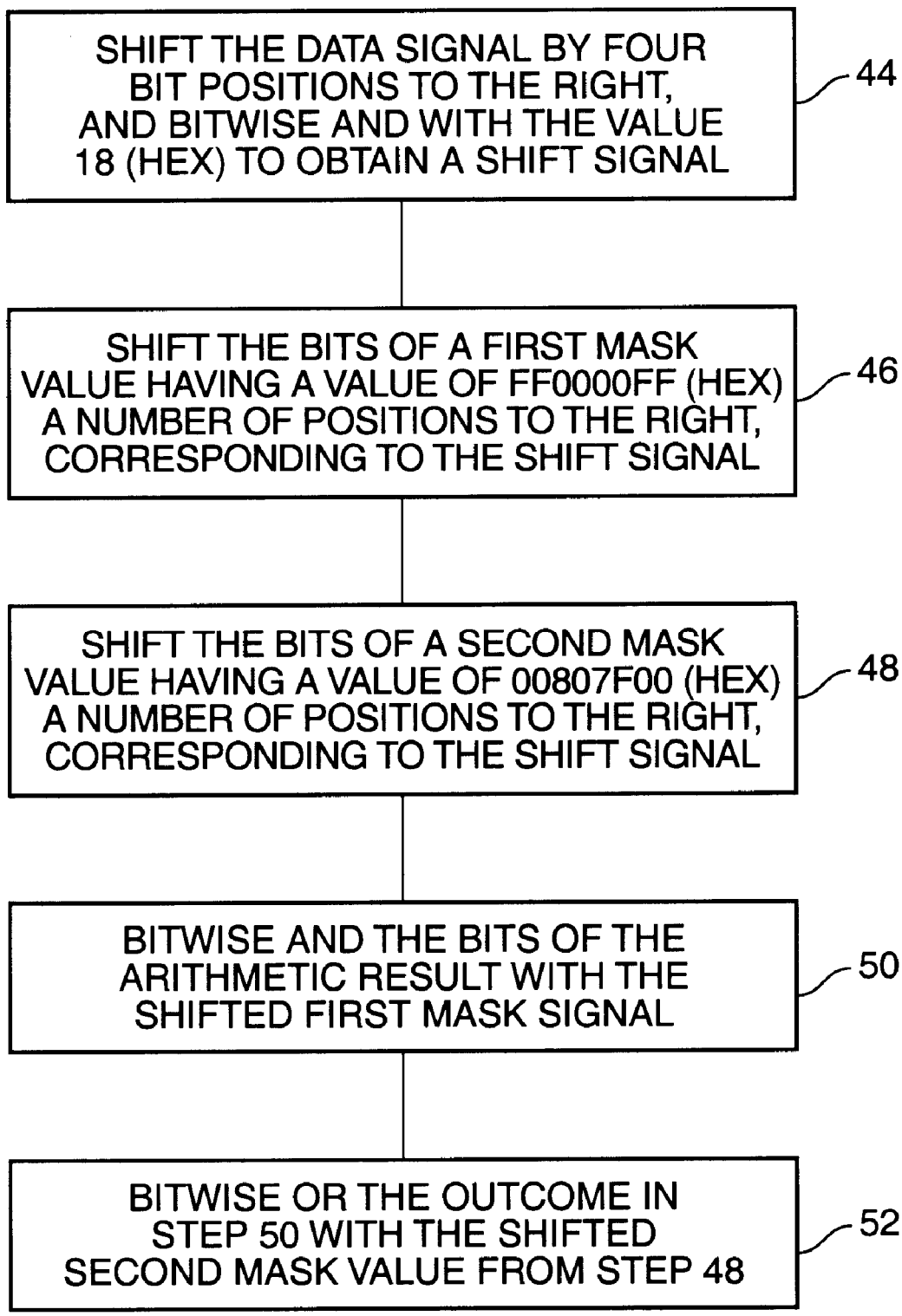
FIG. 3 is a process flow diagram showing the method of operation in accordance with a preferred embodiment of the present invention.

FIG. 3 is a process flow diagram showing the method of operation in accordance with a preferred embodiment of the present invention.

Referring now to FIG. 3, at step 44 a processor determines whether an intermediate result signal is in a positive overflow state or negative overflow state Specifically, the processor is directed under program control to bitwise shift the intermediate data signal four bit positions to the right which is then bitwise ANDed ("masked") with a signal having a value 18 (hex) to obtain a shift signal.

As known in the art, a bitwise AND operation passes through all bits that are ON in bit positions that correspond to bit positions in first mask signal having an ON bit. All other bit positions, whether ON or OFF, that correspond to bit positions in the first mask signal having an OFF bit are set to the OFF position.

As known in the art, shifting a binary value four positions to the right is equivalent to performing a divide operation where the dividend is equal to the value of 16. Also, the value 18 (hex) may be appropriately filled with additional binary signals of the value zero, depending on the size of the intermediate register used. This provides a level of scalability as to the size to the intermediate register.

At step 46, the processor shifts a first mask signal having a binary value of FF0000FF (hex) a number of bit positions to the right equal to the shift signal from step 44 to obtain a first mask template signal.

At step 48, the processor shifts a second mask signal having a binary value of 00807F00 (hex) a number of bit positions to the right equal to shift signal from step 44 to obtain a second mask template signal.

At step 50, the processor masks the intermediate result signal with first mask signal to obtain a translated data signal. Specifically, this mask operation includes bitwise ANDing the intermediate result signal with the first mask signal.

At step 52, the processor performs a bitwise OR operation on translated data signal using second mask signal. As known in the art, a bitwise OR operation turns all bits that are OFF to ON in bit positions that correspond to bit positions in second mask signal having an ON bit. All other bit positions, whether ON or OFF, that correspond to bit positions in the second mask signal having an OFF bit are passed through without change.

The above method of operation essentially is based on the analysis of the 9th and 8th bits of the intermediate result signal. The bits are interpreted in the following way. A binary status of "00" or "11" indicates that intermediate result signal is inside the range of a signed 8-bit integer in two's compliment format, which is a range between 127 and −128. A binary status of "01" indicates a positive overflow state with the intermediate result signal being greater than an upper boundary of 127. A binary status of "10" indicates a negative overflow state with the intermediate result signal being greater than a lower boundary of −128.

First and second masks signals are initialized to have initial values FF0000FF (hex) and 00807F00 (hex), respectively, which are bitwise shifted in response to steps 46 and 48. In essence, the first mask signal is set to have 8 lower bits in an OFF position when intermediate result signal is in the positive or negative overflow state. Otherwise first mask signal is set to have 8 lower bits in an ON position.

The second mask signal is set to have 8 lower bits in the OFF position when intermediate result signal is not in the positive or negative overflow state, i.e., when the intermediate result signal is inside the range of a signed 8-bit integer. Otherwise, the second mask signal is set equal to upper threshold signal when the intermediate result signal is in an overflow state or set to a lower threshold signal when the intermediate result signal is in a negative overflow state. For a signed 8-bit integer in two's compliment format the upper and lower threshold signals are equal to 127 and −128, respectively.

Alternative Embodiments

Alternative embodiments of the present invention may include embedding the steps of the method of the present invention into a Field Programmable Gate Architecture (FPGA) as is well-known in the art, or using an integrated circuit design program such as VHDL to describe the method, thus hard coding the method in an application-specific integrated circuit (ASIC). The skill necessary to perform such embedding and hard coding is well-known to those of ordinary skill in the art.

While preferred embodiments are disclosed herein, many variations are possible which remain within the concept and scope of the invention, and these variations would become clear to one of ordinary skill in the art after perusal of the specification, drawings and claims herein.

What is claimed is:

1. An apparatus for optimizing the overflow checking and reduction of signed data signals, the apparatus comprising:
   a processor;
   a first register coupled to said processor and responsive thereto, said first register for storing a first image signal represented as a signed 8-bit integer;
   a second register coupled to said processor and responsive thereto, said second register for storing a second image signal represented as a signed 8-bit integer;
   an intermediate register coupled to said processor and having a width wider than said first and second registers, said processor image processing the first and second image signals from said first and second registers, respectively, to obtain an intermediate signal which is held by said intermediate register; and wherein said processor determines when said intermediate signal is in a positive overflow state or a negative overflow state;

sets a first mask signal to have 8 lower bits in an OFF position when said intermediate signal is in said positive or negative overflow state, otherwise setting said first mask signal to have 8 lower bits in an ON position;

sets said second mask signal equal to an upper threshold signal when said intermediate signal is in an overflow state or sets said second mask signal to a lower threshold signal when said intermediate signal is in a negative overflow state, otherwise said processor sets a second mask signal to have 8 lower bits in the OFF position;

bitwise ANDs said intermediate signal with said first mask signal to obtain a translated data signal; and bitwise ORs said translated data signal with said second mask signal.

2. The apparatus of claim 1, wherein said processor determines when said intermediate signal is in a positive overflow state or a negative overflow state by bitwise shifting said intermediate signal four positions to the right to obtain a resultant signal and masking masks said resultant signal with a value of 18 (hex).

3. The apparatus of claim 1, wherein said processor determines when said intermediate signal is in a positive overflow state or a negative overflow state by dividing the intermediate signal by 16 and storing the dividend in a first variable; and masking said first variable with a value 18 (hex) to obtain a masked first variable.

4. The apparatus of claim 1, further comprising:

a data store bus coupled to said processor; and a data store coupled to said data store bus, said data store responsive to read and write commands from said processor.

5. The apparatus of claim 1, wherein said means for processing includes means for shifting said data signal by four bit positions to the right to obtain an intermediate signal; and means for ANDing the bits of said intermediate signal with the value 18 (hex) to obtain a shift signal.

6. A program storage device readable by a machine, tangibly embodying a program of instructions executable by the machine to perform a method for reducing a computational result to range boundaries of a signed 8-bit integer in case of overflow, the method comprising:

storing a first image signal represented as a signed 8-bit integer in a first register;

storing a second image signal represented as a signed 8-bit integer in a second register;

processing the first and second image signals from said first and second registers, respectively, to obtain an intermediate signal which is held by an intermediate register;

determining when said intermediate signal is in a positive overflow state or a negative overflow state by bitwise shifting said intermediate signal four positions to the right to obtain a resultant signal and masking masks said resultant signal wit a value of 18 (hex);

setting a first mask signal to have 8 lower bits in an OFF position when said intermediate signal is in said positive or negative overflow state, otherwise setting said first mask signal to have 8 lower bits in an ON position;

setting said second mask signal equal to an upper threshold signal when said intermediate signal is in an overflow state or setting said second mask signal to a lower threshold signal when said intermediate signal is in a negative overflow state, otherwise setting a second mask signal to have 8 lower bits in the OFF position;

bitwise ANDing said intermediate signal with said first mask signal to obtain a translated data signal; and bitwise ORing said translated data signal with said second mask signal.

7. A program recorded in a computer-readable medium for increasing the processing throughput of a processor, the program comprising:

means for shifting a signed data signal four bit positions to the right to obtain a resultant signal;

means for masking said resultant signal with a value 18 (hex) to obtain a masked first signal;

means for shifting a first mask signal having a binary value of FF0000FF (hex) a number of bit positions to the right equal to said masked first signal from said masking step to obtain a first mask template signal;

means for shifting a second mask signal having a binary value of 00807F00 (hex) a number of bit positions to the right equal to said masked first signal from said masking step to obtain a second mask template signal;

means for masking said signed data signal with said first mask template signal; and means for turning all bits ON in bits positions that correspond to bit positions in said second mask template signal having an ON bit.

8. An apparatus for optimally reducing a signed data signal to a specified threshold signal in a computer system, the apparatus comprising:

means for processing data signals to obtain an intermediate signal having an 8th and 9th bit;

means for creating a first mask signal having a signal value represented by 8-bit positions having an ON state starting from the least significant bit position and a second mask signal represented by 8-bit positions OFF starting from the least significant bit position when said 8th and 9th bit positions of said intermediate data signal are OFF;

means for creating a first mask signal having a signal value represented by 8-bit positions having an OFF state starting from the least significant bit position and a second mask signal represented by the first 7 bit positions having an OFF state and the 9th bit position in an ON state, when said 8th position of said intermediate signal is ON;

means for creating a first mask signal having a signal value represented by 8 bit positions having an OFF state starting from the least significant bit position and a second mask signal represented by the first 7 bit positions having an ON state and the 8th bit position in an OFF state, when said 8th bit position of said intermediate signal is ON;

means for creating a first mask signal having a signal value represented by 8-bit positions ON starting from the least significant bit position and a second mask signal represented by 8-bit positions OFF starting from the least significant bit position when said 8th and 9th bit positions of said intermediate signal are ON;

means for masking said data signal by said first mask signal to obtain a masked result; and means for turning all bits ON in said masked result that are in bit positions that correspond to bit positions in said second mask signal that are ON to obtain a reduced image signal.

* * * * *